United States Patent [19]
Ronzio et al.

[11] 3,957,946
[45] May 18, 1976

[54] MOLYBDENUM OXIDE PURIFICATION PROCESS

[75] Inventors: Richard A. Ronzio, Golden; Robert C. Ziegler, Lakewood; Fred N. Oberg, Arvarda; R. Stanley Rickard, Lakewood, all of Colo.

[73] Assignee: Amax Inc., New York, N.Y.

[22] Filed: Dec. 23, 1974

[21] Appl. No.: 535,671

[52] U.S. Cl. .................................. 423/56; 423/54; 423/58; 423/61; 423/593; 423/606
[51] Int. Cl.² ........................................ C01G 39/00
[58] Field of Search .................. 423/53, 54, 56–58, 423/61, 593

[56] References Cited
UNITED STATES PATENTS

| | | | |
|---|---|---|---|
| 2,876,065 | 3/1959 | Zimmerley et al. | 423/54 |
| 3,458,277 | 7/1969 | Platzhe et al. | 423/54 |
| 3,829,550 | 8/1974 | Ronzio et al. | 423/54 |
| 3,848,049 | 11/1974 | Ronzio et al. | 423/54 |

*Primary Examiner*—Herbert T. Carter
*Attorney, Agent, or Firm*—Harness, Dickey & Pierce

[57] ABSTRACT

A process for purifying concentrates of molybdenum oxide containing a variety of naturally-occurring contaminating metals, such as potassium, copper, calcium, magnesium, iron, aluminum, lead, zinc, bismuth, and the like, as well as compounds thereof, by roasting the impure concentrate at an elevated temperature in an oxygen atmosphere to convert sub-oxides of molybdenum to molybdenum trioxide and contaminating metal molybdites to corresponding metal molybdates, which are extracted by a hot aqueous leaching of the concentrate and the solubilized molybdate ions are recovered. The aqueous leached concentrate, after separation from the aqueous leach solution, is leached with an ammoniacal leach solution for converting the molybdenum trioxide constituent therein into soluble ammonium molybdate compounds, and the resultant leach solution is removed from the remaining insoluble residue, which is discarded. The ammoniacal leach solution containing only minimal quantities of remaining contaminating metal ions can be further purified by passage through a chelating cation exchange resin, whereafter the ammonium molybdate compounds are recovered, such as by evaporative crystallization, to produce a high purity ammonium dimolybdate (ADM) product, or alternatively, can be calcined at an elevated temperature to produce a high purity molybdenum trioxide product.

17 Claims, 4 Drawing Figures

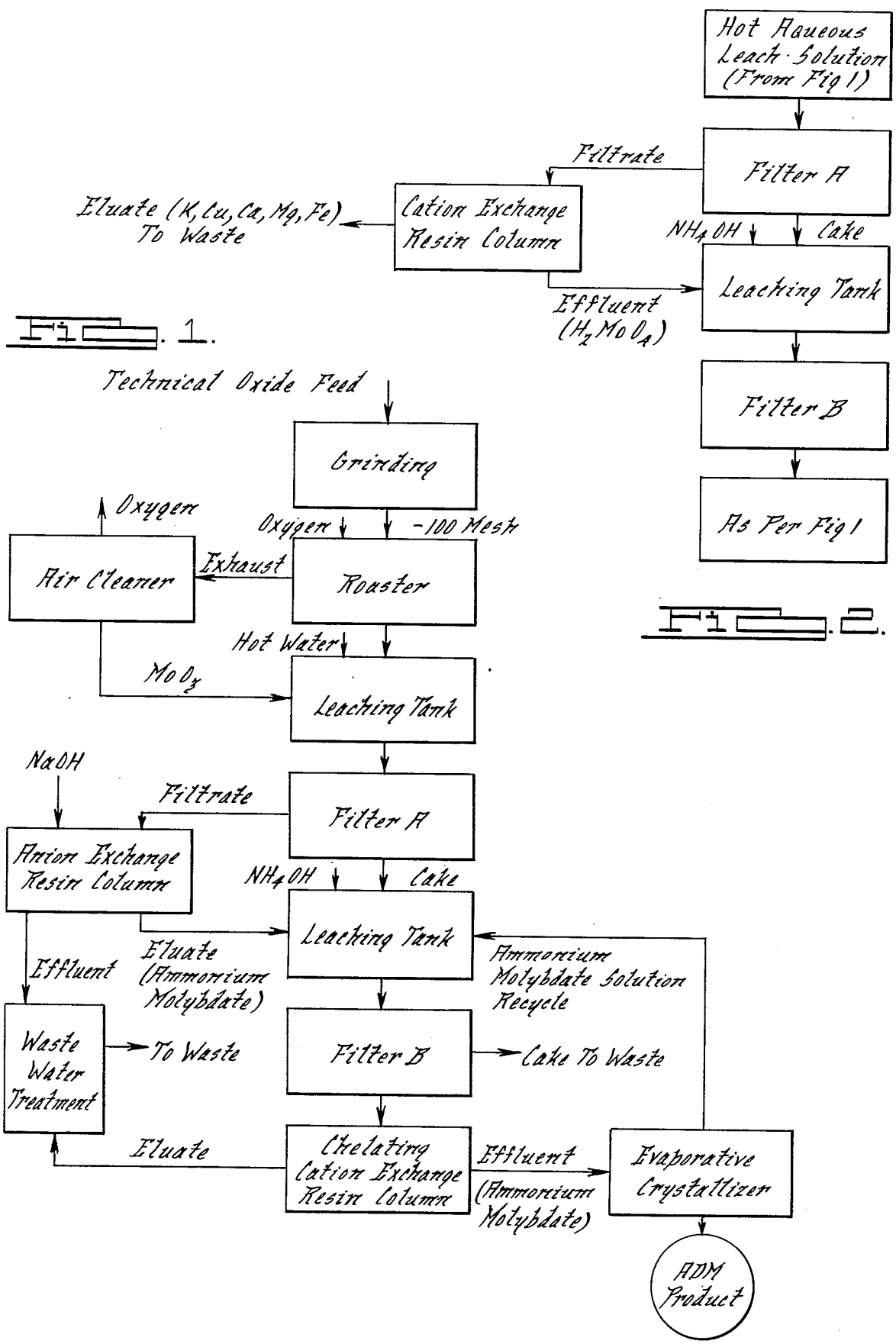

MOLYBDENUM OXIDE PURIFICATION PROCESS

BACKGROUND OF THE INVENTION

A variety of processes and purification techniques have heretofore been proposed or used for extracting all or selected ones of a variety of normally-occurring contaminating metals and/or metal compounds in technical grade molybdenum oxide concentrates. The removal of such contaminating cations is necessary to provide a molybdenum oxide or ammonium molybdate product of satisfactory purity to enable its use in the synthesis of various molybdenum compounds, in the production of molybdenum catalysts and such other uses requiring a high purity molybdenum metal. Perhaps the principal objection to prior art purification processes has been the high cost and/or low yields associated with their operation, rendering them commercially unacceptable from an economic standpoint. In many instances, the large volume of waste streams generated in the course of such purification processes has occasioned a considerable investment in waste treatment equipment and in chemical reagents, still further detracting from the overall economics of such purification processes.

The process of the present invention overcomes many of the problems and disadvantages associated with prior art type purification processes in enabling the purification of technical grade molybdenum oxide concentrates to a substantially high purity molybdenum product at commercially attractive costs and without the generation of voluminous waste streams, thereby eliminating costly pretreatments prior to discharge to waste.

SUMMARY OF THE INVENTION

The benefits and advantages of the present invention are achieved by a process for effecting a purification of an impure concentrate of molybdenum oxide which is first subjected, if necessary, to a grinding operation to reduce its average particle size to less than about 100 mesh, and thereafter roasting the ground concentrate at an elevated temperature preferably ranging from about 550°C to about 650°C in an enriched atmosphere high in oxygen content so as to convert the sub-oxides of molybdenum to molybdenum trioxide and the contaminating metal molybdite compounds to the corresponding metal molybdate compounds, which are water-soluble and can be removed from the concentrate by a hot aqueous leaching operation. The aqueous leach solution is separated from the residual concentrate and the valuable molybdate anions therein are recovered by ion exchange or by forming a precipitate thereof, while the contaminating metal cations are discarded to a waste treatment system. The residual concentrate is digested with an ammoniacal leach solution to convert the valuable molybdenum trioxide constituent therein to ammonium molybdate compounds and the resultant ammoniacal leach solution is separated from the remaining insoluble residue, which is also discarded to waste. A recovery of the ammonium molybdate compounds from the ammoniacal leach solution can be effected by evaporative crystallization to produce an ammonium dimolybdate product, or alternatively, the ammonium compounds can be further calcined to produce a high purity molybdenum oxide product. It is also preferred that the ammoniacal leach solution containing the ammonium molybdate compounds is passed through a chelating cation exchange resin to effect an adsorption of any residual contaminating metal cations remaining prior to the evaporative crystallization step.

Additional benefits and advantages of the present invention will become apparent upon a reading of the description of the preferred embodiments taken in conjunction with the accompanying flow diagrams depicted in the drawings.

BRIEF DESCRIPTION OF THE DRAWING

FIG. 1 is a flow diagram illustrating the important steps of the purification process in accordance with one of the embodiments of the present invention;

FIG. 2 is a partial flow diagram of an alternative satisfactory embodiment of the present invention utilizing a cation exchange resin for treatment of the filtrate from filter A;

DESCRIPTION OF THE PREFERRED EMBODIMENTS

Figure 3:
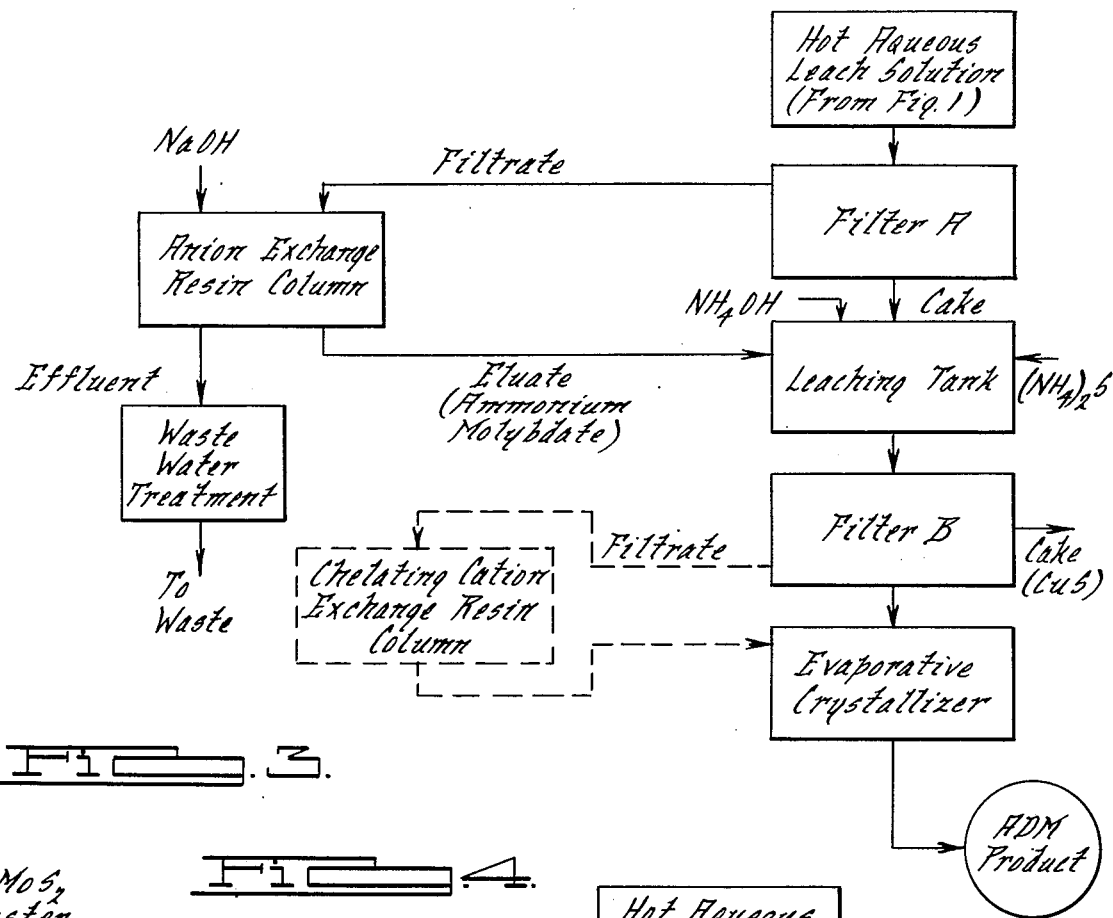
FIG. 3 is a partial flow diagram of still another alternative satisfactory embodiment of the present invention similar to that shown in FIG. 1, but further employing a sulfide compound for effecting a precipitation and removal of contaminating metals in the form of the corresponding sulfide.

The concentrations and/or compositions of the various substances and solutions as herein described and as set forth in the subjoined claims are expressed in terms of percentages by weight unless clearly indicated to the contrary.

The feed material comprises a particulated impure or technical grade concentrate consisting predominantly of molybdenum oxide and containing the contaminating metal constituents and compounds thereof in varying percentages depending upon the characteristics of the original ore body and the manner by which the concentrate is produced. Molybdenum is found in the earth's crust predominantly in the form of molybdenite ($MoS_2$), of which the largest known source is at Climax, Colorado, in which the ore body comprises a highly silicified and altered granite through which the molybdenite is distributed in the form of very fine-sized veinlets usually ranging in concentration from about 0.3% to about 0.6% as mined. The concentration of the molybdenite constituent is increased preferably through an oil flotation extraction operation to reduce the gangue to a level less than about 40%, and preferably less than about 10%.

The flotation extraction operation requires that the ore as mined is ground to a relatively fine particle size, usually 35% plus 100 mesh, whereafter the particles, which are composed principally of molybdenite, are separated from the silicious gangue materials employing a hydrocarbon oil and pine oil in combination with various wetting agents. The particles comprised predominantly of molybdenite are retained in the flotation froth, while the more dense gangue particles consisting predominantly of silica remain in the tailing portion of the pulp. The oil flotation beneficiation process is normally carried out in a series of successive cycles, each including a grinding step followed by a flotation step, in which the particle size of the ore is progressively reduced, and wherein the concentration of the molybdenite in the extracted product is progressively increased until the desired concentration of molybdenite is obtained. This may range from molybdenite contents of about 80% to as high as about 90% and even greater, depending upon the intended end use to which the concentrate is to be applied. The particular concentration of molybdenite is not critical for the purposes of the present invention, although feed materials containing at least about 80% of molybdenum oxide are usually preferred.

The molybdenite concentrate derived from the oil flotation extraction operation is transferred to a roasting operation in which an excess amount of free air is introduced to effect a conversion of the molybdenum disulfide to molybdenum oxides. The roaster may comprise any one of a variety of well known multiple-hearth furnaces such as, for example, Herreshoff, McDougall, Wedge, Nichols, etc., which generally comprise a plurality of annular-shaped hearths disposed in vertically spaced relationship, on which the molybdenite concentrate being roasted is transferred from the uppermost hearth in a cascading fashion downwardly to the lowermost hearth while being exposed to a countercurrent flow of hot flue gases to effect a roasting and oxidation of the molybdenite to molybdenum oxide at temperatures generally ranging from about 550°C to about 700°C. The time, temperature and excess oxygen relationship is controlled so that predominantly all of the original molybdenite present is oxidized.

The resultant roasted concentrate or technical oxide feed material containing various contaminating metal compounds comprises the feed material of the purification process of the present invention and as shown in FIG. 1, is fed, if necessary, to a grinding operation in which the particles thereof are reduced to an average size of less than about 100 mesh and any agglomerates produced during the prior roasting operating are eliminated. The specific particle size of the feed material from the grinding operation is preferably less than 100 mesh, with the smaller particle sizes being preferred because of the greater surface area and exposure of the feed to the various agents, reagents and solutions, thereby reducing the retention time in the several process steps.

Following the grinding step which is common to each of the embodiments illustrated in flow sheets FIGS. 1–4, inclusive, the feed material is subjected to a re-roasting operation in the presence of an oxygen enriched atmosphere and preferably in a substantially pure oxygen atmosphere at atmospheric pressure at a temperature of from about 550°C to about 650°C and for a period of time to convert substantially all of the sub-oxides or lower oxides of molybdenum to the molybdenum trioxide state and to further convert the contaminating metal molybdite compounds to corresponding metal molybdate compounds, which are water soluble and can subsequently be leached from the reroasted feed material in the succeeding hot aqueous leaching step. The use of oxygen-rich atmospheres such as oxygen-enriched air containing upwards of 40% oxygen, and preferably substantially 100% oxygen have provided an unexpected disproportionate acceleration in the oxidation conversion reaction during the reroasting step and achieving yields heretofore unattainable as a result of prolonged roasting in air. The use of substantially pure oxygen atmospheres, in particular, has resulted in a conversion of contaminating metal compounds, such as potassium compounds, into products rendering them surprisingly susceptible to water leaching, enabling extremely effective extraction thereof to levels heretofore unattainable by aqueous leaching techniques. The use of high oxygen contents in the roasting operation also results in a substantially complete conversion of molybdenum sulfide and lower state oxides to the trioxide state, enabling recovery thereof during the succeeding refining steps. Of particular importance is the speed of the reroasting operation at high oxygen levels, enabling processing within periods of only a fraction of an hour, permitting the use of moderate-size roasters for high throughput and at commercially acceptable operating costs and efficiencies. Inasmuch as only a small percentage of the oxygen in the oxidizing atmosphere is required during the reroasting operation to complete the oxidation of the concentrate feed material, it is convenient to maintain a substantially pure oxygen atmosphere within the reroaster and add make-up oxygen to the recycled atmosphere as required. The conversion of all of the molybdenum present to $MoO_3$ enables upwards of 99% thereof to be extracted during the next ammoniacal leaching step. The reroasting operation is preferably performed in a rotary-type kiln and the supply of oxygen is controlled at a rate slightly in excess of that required to stoichiometrically convert the sub-oxides and molybdites to the fully oxidized state. Ordinarily, retention times of about ¼ to about ½ hour at 600°C to 650°C are adequate for this purpose.

As will be noted in FIG. 1, the roasting operation includes an air cleaning device to recover any airborne material which is separated from the excess oxygen and recycled to the subsequent leaching step. Usually, depending upon the particular particle size of the reroasted concentrate, amounts ranging from about 5% to about 10% of molybdenum trioxide are recovered by the air cleaning device. The air cleaner may comprise any one of a variety of efficient separators of the types well known in the art, of which bag-type cleaners are particularly satisfactory.

The roasted feed material together with the molybdenum trioxide fines recovered in the air cleaner device are transferred in accordance with the sequence illustrated in FIG. 1 to a hot aqueous leaching tank and is pulped with water at a temperature from about 70°C up to about 85°C, and preferably around 80°C at a solids concentration of as low as about 5% up to as high as about 50%, but below that at which difficulty is encountered in achieving good agitation and pumping of the pulped mass to the succeeding filtration step. Ideally, the hot aqueous leaching step is performed at a solids concentration of about 20% requiring retention times of about one hour to effect a substantially complete extraction of the contaminating metal molybdates formed together with some of the molybdenum trioxide. The slurry thereafter is transferred to filter A, and the cake recovered consisting predominantly of molybdenum trioxide together with residual gangue is transferred to an ammoniacal leaching tank, while the filtrate containing the dissolved contaminating metal cations and molybdate anions is transferred to an anion exchange resin column in which the molybdate ions are loaded. The filtrate, which is acidic having a pH of about 2 to about 3 due to the presence of molybdic acid, is adjusted by the addition of a suitable base, such as sodium hydroxide, to a pH of about 3.0 to about 6.5, and preferably to about 3.5. The filtrate containing contaminating potassium, copper, magnesium, calcium, iron, etc. cations together with the molybdate anions passes through the anion exchange column, resulting in a selective adsorption of the molybdate ions, which subsequently are stripped and returned in the eluate to the ammoniacal leach tank, together with the filter cake from filter A.

Anion exchange resins suitable for use in the anion exchange column as shown in FIG. 1 include tertiary amine in a styrene divinylbenzene matrix, available under the designation IRA 93 from Rohm & Haas; type XE 270 and XE 299, which are also tertiary amine-type resin and are available from Rohm & Haas; epichlorhydrine-polyamine condensation-type (aliphatic polyamine types) available in a granular state under the designation A-305 from Ionic Chemical Co., as well as equivalent types effective to selectively extract the molybdate anion in a substantially neutral medium. The contaminating metal cations pass through the column and the effluent thereof is discharged to a waste treatment system to condition the effluent so that it can harmlessly be discharged to waste.

The ion exchange resin in the anion exchange column is conditioned prior to use by treating it with a dilute caustic solution such as, for example, an 8.0% NaOH solution followed by a sulfuric acid solution usually of a concentration of about 4% to about 8% to convert it to the bi-sulfate form. After loading, the resin is eluted, preferably employing an aqueous solution of ammonium hydroxide; ideally, one containing 50 grams per liter (gpl) of $NH_4OH$, and the resultant eluate containing ammonium molybdate is transferred to the ammoniacal leaching tank in accordance with the sequence depicted in FIG. 1. Analyses of the eluate derived under typical test conditions reveals it to contain less than about 1 ppm of each of the contaminating metals, that is, copper, magnesium, calcium, iron, etc. The substantially complete extraction of contaminating metal cations in the aqueous leach step and the efficiency and low content of contaminating metals in the eluate returned to the ammoniacal leach tank enable the production of ammonium molybdate and molybdenum trioxide products containing less than about 5 ppm of contaminating metal cations.

The ammoniacal leaching of the cake derived from filter A in accordance with the flow sheet comprising FIG. 1 is performed at a temperature ranging from about 20°C to about 30°C employing solutions containing from about 10% to about 20% ammonium hydroxide at a solids content of from about 20% to about 35%, and ideally, about 20% solids. Retention times of from about two to about four hours in the ammoniacal leach tank, and typically about four hours, are effective to extract substantially all of the molybdenum trioxide constituent in the cake and the resultant slurry is thereafter transferred to filter B, in which the residual cake containing the aqueous and ammoniacal insoluble constituents comprising predominantly silica are discharged to waste. The filtrate from filter B is transferred to a chelating cation exchange resin column in which the predominant proportion of residual contaminating metal cations, such as copper, calcium and magnesium, are adsorbed and the effluent, consisting of a purified ammoniacal molybdate solution, is transferred to an evaporative crystallizer from which a high purity ammonium dimolybdate (ADM) product is recovered. The residual liquid from the evaporative crystallizer is recycled to the ammoniacal leach tank.

Chelating-type cation exchange resins suitable for use in extracting the residual contaminating cations include amino diacetate functional group containing chelating-type weak acid cation exchange resins, sold commercially under the designation XE-318 by Rohm & Haas and Dowex A1, available from Dow Chemical Company, as well as equivalent type chelating cation exchange resins that are effective to selectively adsorb metal cations in an alkaline medium containing ammonium cations. The resin is conditioned preliminary to use by treating it with a sulfuric acid solution to convert the resin to the hydrogen form. After loading, the cations adsorbed are stripped employing an aqueous sulfuric acid solution containing from about 5% to about 10% acid. The resultant eluate, as shown in FIG. 1, is transferred to the waste treatment system and after neutralization and further processing, is harmlessly discharged to waste.

As previously mentioned, the high purity ammonium dimolybdate product usually containing less than about 5 ppm of contaminating metal cations can be employed directly, or alternatively, if desired, can be subjected to a further calcination treatment by heating to an elevated temperature of from about 500°C to about 600°C for a period of time sufficient to thermally decompose and oxidize the ammonium molybdate compound, producing a correspondingly high purity molybdenum trioxide, while the ammonium vapors produced are recovered and recycled to the ammoniacal leaching step.

An alternative satisfactory embodiment of the treatment and purification of the filtrate derived from filter A from that previously described in connection with FIG. 1 is depicted in FIG. 2. As shown, the acidic filtrate from filter A is transferred to a cation exchange resin column in which the contaminating metal cations are selectively adsorbed and the effluent consisting predominantly of molybdic acid is returned to the ammoniacal leaching tank together with the filter cake from filter A for leaching in the same manner as previously described. A cation exchange resin which may be used in Amerblite IR 120. This resin is a sulfonic type cation exchange resin available from Rohm & Haas. Other equivalent type cation exchange resins that are effective in absorbing potassium, copper, calcium, magnesium and iron in a slightly acid environment could also be used. The resin is preconditioned prior to use with sulfuric acid to convert it to the hydrogen form and after loading, the cations are stripped with sulfuric acid or HCL containing 5% to 10% acid. The resulting eluate is transferred to waste treatment as shown in FIG. 2. The use of a cation exchange resin as in FIG. 2 in lieu of the anion exchange resin column of FIG. 1 dispenses with the need of pH adjustments by the addition of caustic and provides the further benefit in enabling use of a smaller resin column due to the proportionately smaller quantity of contaminating metal cations present in comparison to molybdate ions. Typically, the filtrate from filter A comprises about 16 gpl of molybdate ($MoO_4^{++}$) anions comprising about 1.6% of the solution, while the contaminating metal cations present are in the order of about 400 ppm potassium (0.04%); 5 ppm copper (0.0005%); 5 ppm calcium (0.0005%); 5 ppm magnesium (0.0005%) and 10 ppm iron (0.001%). The eluate from the cation exchange resin column containing the adsorbed potassium, copper, calcium, magnesium, iron, etc., cations are transferred to a waste water treatment system, as in the case of FIG. 1, and after treatment, are harmlessly discharged to waste.

A second alternative satisfactory embodiment from that shown in FIG. 1 is depicted in FIG. 3, in which the ammoniacal leaching of the cake from filter A is performed in the presence of a sulfide compound, such as $NH_4HS$, $H_2S$, or $(NH_4)_2S$, and mixtures thereof, of which ammonium sulfide $[(NH_4)_2S]$ is preferred. The concentration of the ammonium hydroxide in the ammoniacal leach solution is controlled within a range previously described, while the quantity of ammonium sulfide or other sulfide compounds on an equivalent basis may range from about 1.5 to about two times the stoichiometric requirement depending upon the particular concentration of contaminating copper cations present so as to provide a stoichiometric excess to effect a reaction with and a precipitation of the copper cations as copper sulfide (CuS). The precipitated copper sulfide, together with the insoluble constituents in the feed material, are removed in filter B and the resultant cake containing the copper sulfide after suitable treatment is harmlessly discharged to waste.

As shown in FIG. 3, the use of a chelating cation exchange resin column as in the case of the flow diagram comprising FIG. 1 is optional but preferred, and for this reason, the step is indicated in dotted lines. Ordinarily, for short duration runs, the use of a chelating cation exchange resin column is not necessary since the filtrate from filter B is substantially devoid of any contaminating copper cations, while only about 1 ppm of magnesium and calcium cations are present. Contamination levels of the foregoing magnitude are well within the normal acceptable range for purified ammonium dimolybdate products and further purification by adsorption on a chelating cation exchange resin is not necessary. The use of such a chelating type ion exchange resin column, however, is preferred since during continuous sustained operations, a progressive build-up of calcium and magnesium may occur in the evaporative crystallizer, which is avoided by subjecting the filtrate from filter B to further ion exchange treatment at which the ammoniacal solution having a pH higher than 7 is further purified by effecting a selective adsorption of contaminating metal cations including calcium, magnesium, zinc, copper and nickel without any appreciable loading of the ammonium cations.

Figure 4:
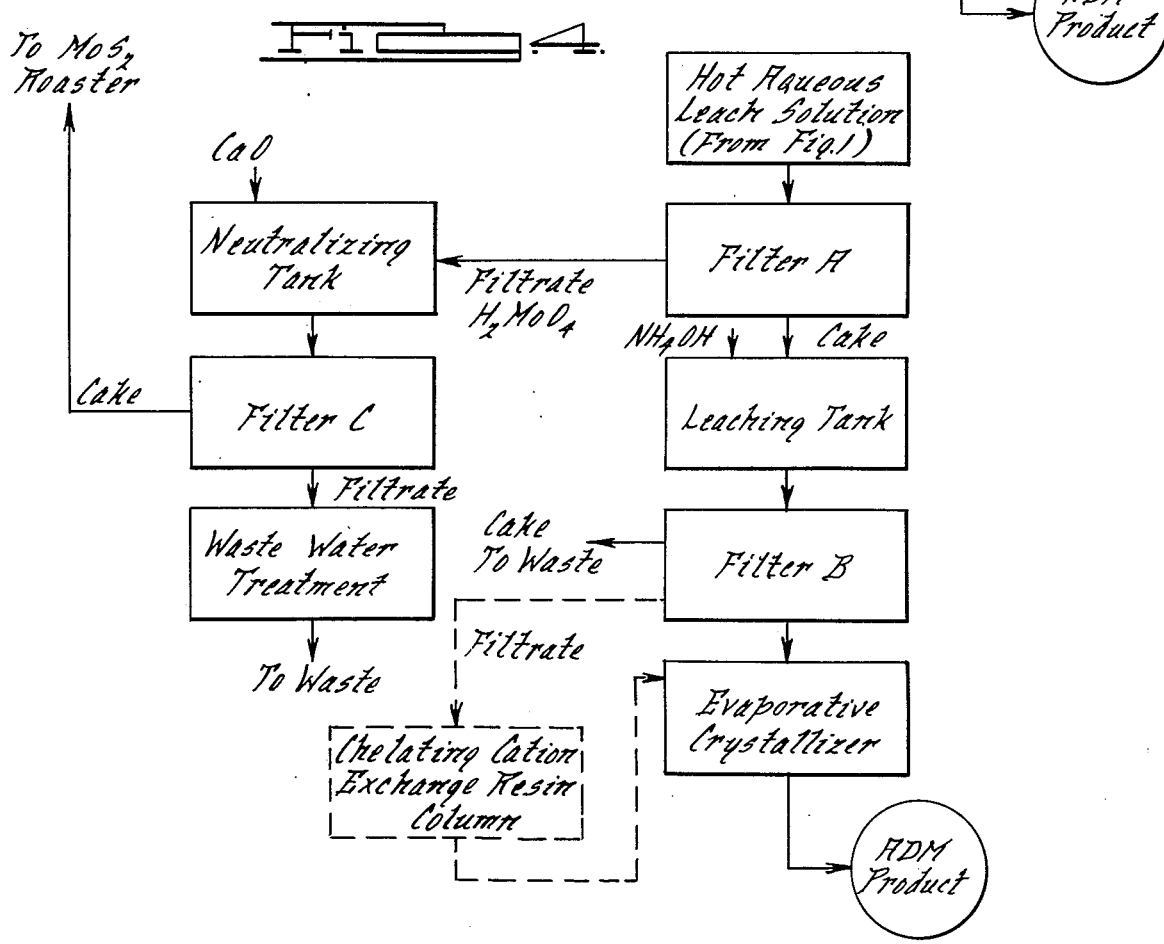
FIG. 4 is a partial flow diagram of still another alternative satisfactory embodiment of the process of the present invention illustrating the use of an alkaline earth metal for recovering the valuable molybdate constituent dissolved in the filtrate from filter A.

A third alternative satisfactory embodiment to that originally described in FIG. 1 is depicted in FIG. 4, in which the anion exchange resin column (FIGS. 1 and 3) or the cation exchange resin column (FIG. 2) to which the filtrate from filter A is transferred, are eliminated and in lieu thereof, a neutralizing tank is employed to which an alkaline calcium compound is added which reacts with the dissolved molybdate anions and all of the metal cation species with the exception of potassium forming precipitates in accordance with the following reactions:

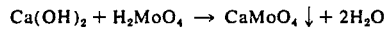

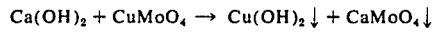

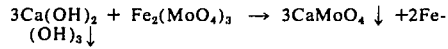

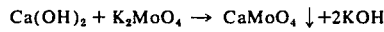

The filtrate and the precipitated compounds are transferred from the neutralizing tank to filter C and the cake recovered, containing predominantly calcium molybdate along with copper hydroxide and iron hydroxide, is recycled to the original multiple-hearth furnace in which the molybdenite concentrate is roasted to a technical oxide feed material while the filtrate containing the predominant proportion of contaminating potassium cations is discharged to the waste treatment system and thereafter to waste. A typical analysis of the ammoniacal filtrate from filter B contains less than 3 ppm iron, less than 1 ppm copper, less than 1 ppm magnesium, less than 1 ppm calcium and less than 50 ppm potassium. In view of the low level of contamination of the filtrate, the use of a chelating cation exchange resin column is optional for the same reasons as described in connection with FIG. 3, but its use is preferred to avoid a build up of calcium and magnesium in the evaporative crystallizer during sustained operations.

While it will be apparent that the invention herein described is well calculated to achieve the benefits and advantages set forth, it will be appreciated that the invention is susceptible to modification, variation and change without departing from the spirit thereof.

What is claimed is:

1. A process for producing a high purity molybdenum-containing product which comprises the steps of providing an impure concentrate of molybdenum oxide, reducing the average particle size of said concentrate to less than about 100 mesh, roasting the said concentrate at an elevated temperature ranging from about 550°C to about 650°C in an oxygen atmosphere containing at least 40% oxygen to convert sub-oxides of molybdenum to molybdenum trioxide and contaminating metal molybdite compounds to metal molybdate compounds, leaching the roasted said concentrate with hot water at a solids concentration of from about 5% up to about 50% to extract the aqueous soluble metal molybdate compounds therefrom, separating the aqueous leached said concentrate from the aqueous leach solution, contacting said aqueous leach solution with an ion exchange resin to separate the solubilized contaminating metal cations from the solubilized molybdate anions and recovering said molybdate anions, leaching the aqueous leached said concentrate with an ammoniacal leach solution to solubilize the molybdenum trioxide therein as ammonium molybdate compounds, separating said ammoniacal leach solution from the remaining insoluble residue and discarding the latter, contacting the separated said ammoniacal leach solution with a chelating cation exchange resin and adsorbing additional residual contaminating metal ions remaining as ammine complexes, and thereafter recovering the ammonium molybdate compounds from said ammoniacal leach solution as a purified product.

2. The process as defined in claim 1, including the further step of adjusting the pH of said aqueous leach solution to within a range of from about 3 to about 6.5 prior to contacting said solution with said ion exchange resin, said resin comprising an anion exchange resin for effecting a separation of the solubilized contaminating metal cations from the solubilized molybdate anions by adsorbing said molybdate anions thereon.

3. The process as defined in claim 2, wherein the recovery of said molybdate anions adsorbed on said ion exchange resin is accomplished by eluting said resin with an ammoniacal solution to convert said molybdate anions to soluble ammonium molybdate compounds in an eluate.

4. The process as defined in claim 3, including the further step of combining said eluate with said ammoniacal leach solution.

5. The process as defined in claim 1, wherein said oxygen atmosphere in said roasting step is substantially pure oxygen.

6. The process as defined in claim 1, wherein said roasting step includes the further step of recovering and recycling airborne fines of said concentrate produced during the roasting of said concentrate.

7. The process as defined in claim 1, wherein said ion exchange resin comprises a cation exchange resin and separation of the solubilized contaminating metal cations from the solubilized molybdate anions is achieved by adsorption of said metal cations on said resin.

8. The process as defined in claim 1, wherein said ion exchange resin comprises a cation exchange resin and separation of the solubilized contaminating metal cations from the solubilized molybdate anions is achieved by adsorption of said metal cations on said resin.

9. The process as defined in claim 7, wherein the recovery of said molybdate anions is achieved by recirculating effluent from said cation exchange resin to the ammoniacal leaching step.

10. The process as defined in claim 1, wherein said ammoniacal leach solution further contains a sulfide compound for reacting with any contaminating metal ions present to form corresponding insoluble metal sulfide precipitates which are discarded with said insoluble residue.

11. The process as defined in claim 10, wherein said sulfide compound comprises ammonium sulfide and said contaminating metal comprises predominantly copper to form an insoluble copper sulfide precipitate which is removed and discarded with said insoluble residue.

12. The process as defined in claim 1, wherein said ammoniacal leach solution further contains a sulfide compound for reacting with any contaminating metal ions present to form corresponding insoluble metal sulfide precipitates which are discarded with said insoluble residue.

13. A process for producing a high purity molybdenum-containing product which comprises the steps of providing an impure concentrate of molybdenum oxide, reducing the average particle size of said concentrate to less than about 100 mesh, roasting said concentrate to an elevated temperature of from about 550°C to about 650°C in a substantially pure oxygen atmosphere to convert sub-oxides of molybdenum to molybdenum trioxide and contaminating metal molybdite compounds to metal molybdate compounds, leaching the roasted said concentrate with hot water to extract the aqueous soluble contaminating metal molybdate compounds therefrom, separating the aqueous leached said concentrate from the aqueous leach solution, recovering the solubilized molybdate anions from said aqueous leach solution and discarding the solubilized contaminating metal ions, leaching the aqueous leached said concentrate with an ammoniacal leach solution to solubilize the molybdenum trioxide therein as ammonium molybdate compounds, separating said ammoniacal leach solution from the remaining insoluble residue and discarding the latter, and thereafter recovering the ammonium molybdate compounds from said ammoniacal leach solution as a purified product.

14. The process as defined in claim 13, including the further step of contacting the separated said ammoniacal leach solution with a chelating cation exchange resin and adsorbing additional contaminating metal cations as ammine complexes prior to recovering said ammonium molybdate compounds from said ammoniacal leach solution.

15. The process as defined in claim 13, wherein the recovery of the solubilized molybdate anions in said aqueous leach solution is achieved by the additional steps of adding a calcium compound to said aqueous leach solution to form insoluble calcium molybdate compounds, extracting said calcium molybdate compounds from said aqueous leach solution and thereafter reroasting the extracted said calcium molybdate compounds and recycling the reroasted said calcium compounds to said impure concentrate of molybdenum oxide for reprocessing.

16. The process as defined in claim 15, including the further step of calcining said crystallized product comprising ammonium molybdate compounds to produce a purified molybdenum oxide product.

17. The process as defined in claim 13, wherein the said ammonium molybdate compounds are recovered from said ammoniacal leach solution by crystallization and extraction of the crystallized product from the residual solution.

* * * * *